United States Patent [19]

König et al.

[11] Patent Number: 4,716,859
[45] Date of Patent: Jan. 5, 1988

[54] PROCESS FOR TREATMENT OF LIQUIDS CONSISTING PRIMARILY OF METHANOL

[75] Inventors: Axel König; Kurt Korbel, both of Wolfsburg; Karl-Werner Ellinger, Rötgesbüttel; Michael Schneider, Ottobrunn-Riemerling; Karel Kochloefl, Moosburg; Ortwin Bock, Landshut-Kumhausen, all of Fed. Rep. of Germany

[73] Assignees: Volkswagen AG, Wolfsburg; Süd-Chemie AG, Munich, both of Fed. Rep. of Germany

[21] Appl. No.: 858,062

[22] Filed: Apr. 30, 1986

[30] Foreign Application Priority Data

May 8, 1985 [DE] Fed. Rep. of Germany ....... 3516562

[51] Int. Cl.$^4$ ............................................... F02B 43/08
[52] U.S. Cl. ................................ 123/3; 123/DIG. 12; 429/17; 429/44
[58] Field of Search ................ 123/3, 1 A, DIG. 12; 429/44, 17

[56] References Cited

U.S. PATENT DOCUMENTS

| | | | |
|---|---|---|---|
| 3,400,019 | 9/1968 | Mathis | 429/44 |
| 3,450,507 | 6/1969 | Korwin | 429/17 |
| 4,244,188 | 1/1981 | Joy | 123/3 |
| 4,282,835 | 8/1981 | Peterson et al. | 123/3 |
| 4,366,782 | 1/1983 | Jackson et al. | 123/3 |
| 4,441,461 | 4/1984 | Yoon et al. | 123/3 |
| 4,499,863 | 2/1985 | Gandhi et al. | 123/3 |
| 4,519,342 | 5/1985 | Yoon | 123/3 |
| 4,520,764 | 6/1985 | Ozawa et al. | 123/3 |
| 4,567,857 | 2/1986 | Houseman et al. | 123/3 |

FOREIGN PATENT DOCUMENTS 372383  5/1932  United Kingdom ............. 123/3

OTHER PUBLICATIONS

SAE Technical Paper Series 850573, "Engine Operation on Partially Dissociated Methanol," Axel König, Karl-Werner Ellinger and Kurt Korbel, Feb. 25–Mar. 1, 1985.

*Primary Examiner*—E. Rollins Cross
*Attorney, Agent, or Firm*—William R. Price

[57] ABSTRACT

Process for the treatment of liquids consisting mainly of methanol as fuels for mobile or stationary combustion engines or as hydrogen sources for fuel cells, which comprises passing the methanol mixture through a reaction chamber containing a noble metal supported catalyst for the catalytic decomposition or steam reforming of methanol, which is composed of: (A) a noble metal component of one or more elements of Group VIII of the Periodic Table on a carrier material which comprises, ($B_1$) $TiO_2$ or $CeO_2$, singly or in admixture with other refractory metallic oxides and/or binders, or ($B_2$) $TiO_2$ or $CeO_2$, applied to the surface of a preformed refractory carrier.

39 Claims, 1 Drawing Figure

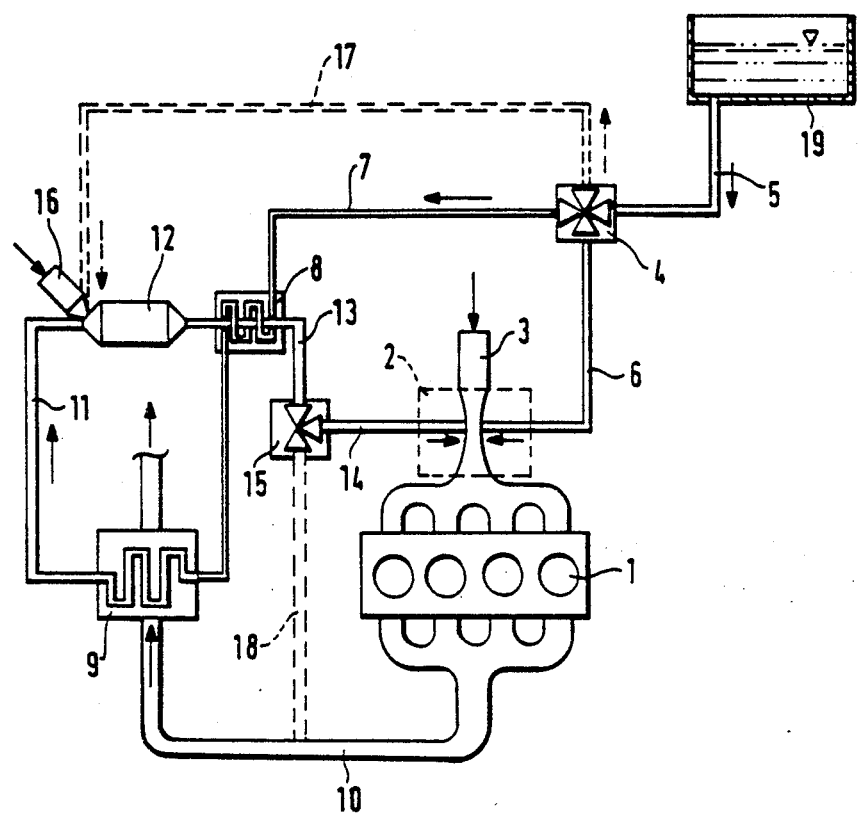

PROCESS FOR TREATMENT OF LIQUIDS CONSISTING PRIMARILY OF METHANOL

FIELD OF THE INVENTION

The invention concerns a process for the treatment of

The invention concerns a process for the treatment of liquids consisting mainly of methanol as fuels for mobile or stationary combustion engines or as source of hydrogen for fuel cells, with a reaction chamber containing a noble metal of Group VIII of the Periodic Table supported catalyst for the catalytic decomposition or steam reforming of at least part of the methanol at elevated temperatures.

BACKGROUND OF THE INVENTION

The following explanations refer mainly to a system for processing fuel, since the preferred application of the process according to the invention is in this area.

Fuel processing processes are known in which at least part of the liquid fuel to be fed into a combustion engine for work, is first catalytically decomposed under reducing or partly oxidizing conditions. The decomposition of the liquid fuel, preferably into gaseous carbon monoxide and hydrogen, is expected to result in a better combustion that produces less harmful substances in the combustion engine, particularly during idling and at low speeds as well as during cold starting and during the warm-up phase.

The utilization of methanol as fuel proved particularly favorable in this case. For one, this fuel can be prepared relatively easily and at relatively low cost from almost all primary energy sources containing carbon. Furthermore, the methanol decomposition reaction is an endothermic process in which the otherwise lost heat of the exhaust gases from the combustion engine can be used to increase the efficiency. Finally, the reaction gases produced during the methanol decomposition contain a relatively large amount of hydrogen, which burns cleanly and ignites even at very lean fuel to air ratios, which contributes to a desirable reduction of the consumption of the combustion engine, especially at low speeds.

The methanol is decomposed according to the equation $$CH_3OH \rightleftharpoons CO + 2H_2 \quad (1)$$

The reaction (1) is strongly endothermic and can be carried out at temperatures above 200° C. with the aid of heterogeneous catalysts. The gas mixture obtained (known as synthesis gas) contains approximately 33 vol % CO and 66 vol % $H_2$.

Another industrially interesting process is methanol steam reforming, which proceeds according to the equation $$CH_3OH + H_2O \rightleftharpoons CO_2 + 3H_2 \quad (2)$$

This endothermic reaction can also be regarded as a combination of the methanol decomposition reaction (1) and water gas shift reaction according to the equation $$CO + H_2O \rightleftharpoons CO_2 + H_2 \quad (3)$$

Methanol steam reforming is usually catalyzed by the same catalysts as the methanol decomposition.

THE PRIOR ART

Until now, base metal catalysts comprising copper and chromium, and promoted with zinc, were used for these reactions because of the low reaction temperatures and the high degree of conversion that could be obtained. But a definite disadvantage of these catalysts is their thermal instability and especially the fact that they cannot be used under partly oxidizing conditions, i.e. with the addition of oxygen. On the other hand, the decomposition reaction in particular is expected to proceed not only under reducing but also under partly oxidizing conditions in order that the heat balance of the reaction can be controlled especially with regard to an autothermic reaction course.

The use of noble metal catalysts for the decomposition of methanol was attempted (for qeneral industrial purposes, but not for fuel processing), mainly because of their capability to function under partly oxidizing conditions. These catalysts have been so developed that a honeycomb-like carrier body made of ceramic material, e.g. cordierite, with numerous flow channels traversing it longitudinally is covered with an intermediate support layer consisting primarily of aluminum oxide ($Al_2O_3$), which acts as the support for the catalytically active layer consisting of noble metals.

Another possibility of preparing the catalyst consists of applying the noble metal layer to ceramic shaped bodies that are themselves either made of aluminum oxide ($Al_2O_3$) or some other ceramic material containing an intermediate layer of $Al_2O_3$.

These noble metal catalysts, when properly selected and combined, can carry out the methanol decomposition even under partly oxidizing conditions at relatively low temperatures and with favorable degrees of conversion. However, the formation of dimethyl ether and coke in a considerable amount is a disadvantage. While the coke deactivates the active centers of the catalyst carrier and even clogs the flow channels of the catalyst body when present in relatively large quantities, the dimethyl ether is undesirable because of its low antiknock value in fuels for combustion engines.

SUMMARY OF THE INVENTION

An object of this invention is the provision of a process for the processing of liquids consisting mainly of methanol of the type defined above, in which the catalytic decomposition or steam reforming of the methanol proceeds at a low optimal conversion temperature, especially under partly oxidizing conditions and in which further the formation of dimethyl ether and coke is largely prevented. Another object of this invention is the provision of a process which guarantees the highest possible degree of conversion with a uniform or easily controllable composition of the decomposition gases throughout the entire range of the operating temperature with a high proportion of hydrogen.

This objective is reached according to the invention through the use of a catalyst that comprises:

(A) a noble metal component consisting of one or several elements of group VIII of the Periodic Table on a carrier comprising (B1) $TiO_2$ or $CeO_2$, singly or in admixture with themselves or with other inert refractory metallic oxides and/or a hydraulic binder, or (B2) of $TiO_2$ and/or $CeO_2$, deposited as an intermediate layer to the surface of a preformed inert refractory carrier.

DESCRIPTION OF THE DRAWING

The attached drawing is a diagrammatic representation of the fuel processing system for a stationary or an automotive internal combustion engine.

DESCRIPTION OF THE PREFERRED EMBODIMENT

Tests have shown that the use of these catalysts results in a very favorable, largely coke-free methanol decomposition at decomposing temperatures in the range of 300°–600° C. in which the reaction gas contains mainly carbon monoxide and hydrogen, but hardly any amounts of dimethyl ether. Thus, this type of catalyst is particularly suitable for use in a fuel processing system for combustion engines in which methanol is used as fuel and in which this is decomposed under reducing or partly oxidizing conditions in a reaction chamber. Further, the proportion of hydrogen in the gaseous reaction mixture can be increased simply by the addition of water according to equation (2). This is advantageous especially for cold-starting conditions or when a cheap hydrogen source is desired for fuel cells. In the latter case, the formed $CO_2$ can be separated from the hydrogen by known methods (e.g. by absorption in an alkaline medium or by fractional condensation).

The noble metal component (A) of the catalyst used according to the invention is preferably platinum. However, rhodium and/or iridium and alloys of these metals may also be used.

The concentration of the noble metal component (A) is preferably 0.01 to 3 wt %, preferably 0.05 to 0.3 wt %, with regard to the total catalyst. To increase the thermal resistance or stability of the catalysts, the oxidic carrier ($B_1$) or the intermediate layer ($B_2$), which is $TiO_2$ or $CeO_2$, or a mixture of $TiO_2$ or $CeO_2$, can contain as other refractory metallic oxides $ZrO_2$ or $La_2O_3$ in concentrations from 1 to 20 wt %, preferably 1 to 10 wt %, particularly 5 to 10 wt %. The hydraulic binder, preferably Portland or calcium aluminate cement, also contributes to increase the mechanical strength. The concentration of the hydraulic binder generally amounts to 5 to 50 wt %, preferably 15 to 25 wt %, with regard to the total catalyst. Cordierite, mullite, silicon carbide or $\alpha\text{-}Al_2O_3$ are used preferably as preformed refractory carriers.

The oxidic carrier according to variant ($B_1$) or the preformed refractory substrate according to variant ($B_2$) can be in the form of rings, spheres or honeycomb-like shapes, tablets or extrusion molded shapes.

The catalysts used in the systems according to the invention can be prepared by various methods.

According to one variant, the catalyst is prepared by pressing the starting component for ($B_1$) without hydraulic binder with a lubricating substance, such as aluminum stearate and/or graphite, to form molded shapes, calcining of the molded shapes and impregnating the calcined molded shapes with the noble metal component (A). According to another variant, the catalyst is prepared by the addition of water and lubricants such as aluminum stearate and/or graphite to the starting components for ($B_1$) containing a hydraulic binder, the producing of molded shapes, drying and calcining of the molded shapes and subsequent impregnation of the calcined molded shapes with the noble metal component (A).

According to another variant, the catalyst can be prepared by applying the components of ($B_2$), i.e. $TiO_2$ and/or $CeO_2$ in the form of their soluble salts to the surface of the preformed refractory substrate, calcining of the substrate treated in this manner and impregnating the calcined substrate with the noble metal component (A). In this case, the water- or methanol-soluble salts of the components of ($B_2$), e.g. the nitrates, formates, acetates or oxalates are preferably used. The preformed refractory substrate is dipped in the salt solution or impregnated with it in this case.

According to a further variant, the catalyst can be obtained by impregnation or dipping of the preformed refractory substrate with or in an alcoholic, especially methanolic solution of an alkoxytitanate, calcining of the substrate treated in this manner and dipping the calcined substrate into the noble metal component (A). The adhesion of the titanium dioxide to the preformed molded shapes can be improved by the use of alkoxytitanates such as tetraisopropyl titanate, $((CH_3)_2CHO)_4Ti$, or tetra-n-butyl titanate, $(n\text{-}C_4H_8O)_4Ti$. The alkoxytitanates are preferably hydrolyzed with steam before calcining.

In all variants or preparation of the catalyst, the impregnation of the carrier with the noble metal component is carried out by well-known methods, using water-soluble salts of noble metals, especially of $H_2PtCl_6$ or $(NH_4)_2PtCl_6$ or the corresponding salts of Rh or Ir. The catalyst precursors prepared by this method are then dried and calcined. Calcining usually is performed at 450° to 650° C., preferably at 550° to 640° C.

To obtain the respective noble metals from the salts of the noble metals, the calcined catalyst precursor is activated by reduction with hydrogen. The activation can be done immediately after calcining or later in the reaction chamber of the processing system.

The invention also contemplates the catalytic decomposition or steam reforming of liquids consisting mainly of methanol at autothermic conditions with the addition of oxygen or of a gas containing oxygen. Preferably, water is added to the methanol, and the conversion of the aqueous methanol mixture is then carried out preferably at a temperature in the range of from 300° to 600° C., a pressure in the range of 0.1 to 10 bar, and a liquid space velocity of from 0.5 to 20 liters hydrous methanol per hour and per liter of catalyst.

A practical example of a fuel processing and feeding system for a combustion engine is shown in the drawing, in which methanol is used as fuel and decomposed in a reaction chamber.

In the drawing, 1 indicates a regular conventional combustion engine with several cylinders, which sucks in air through an intake line 3. A fuel metering device is indicated by 2, through which fuel is fed in liquid and/or gaseous phase, depending on the operating condition of the combustion engine. For this purpose, a gas line 14 feeding gaseous fuel as well as a fuel line 6 feeding liquid fuel are connected to the fuel metering device 2, and fuel line 6 can be connected through a first control valve 4 to a fuel line 5 extending from a fuel storage tank 19. Fuel storage tank 19 contains liquid methanol as fuel.

A second fuel line 7, which can be operated by control valve 4 alternatively or additionally, is connected through a first heat exchanger 8 as well as a second heat exchanger 9 to a fuel line 11 leading into a reaction chamber 12, in which the methanol used as fuel is transported mainly in the vapor state. In reaction chamber 12 there is a catalyst that causes a decomposition of the methanol under the effect of elevated temperatures in the range of approximately 300°–600° C. under reducing or partly oxidizing conditions, so that a reactor gas is present at the outlet of reaction chamber 12, which contains mainly CO and $H_2$ and also $CO_2$ and $H_2O$ when obtained under partly oxidizing conditions. This gas is removed through line 13 and fed by a second control valve 15 into gas line 14 leading into fuel metering device 2.

A burner provided at the intake of reaction chamber 12 is indicated by 16, which sucks air from the environment and feeds it into reaction chamber 12 for the production of the partly oxidizing atmosphere. In addition, burner 16 obtains fuel during the starting operation through a starting line 17 from the first control valve 4, which is ignited and burned during this starting operation for the purpose of heating the reaction chamber. The combustion gases produced in the reaction chamber during this starting operation are led by proper switching of the second control valve 15 through a line 18 directly into an exhaust gas line indicated by 10, which removes the combustion gases of combustion engine 1.

The heat of reaction needed in reaction chamber 12 for the performance of the endothermically proceeding methanol decomposition process is provided by the heating, vaporizing and super-heating of the fuel supplied for this decomposition process in two heat exchangers 8 and 9 in the practical example shown in the drawing and in addition by an exothermic partial oxidation of the fuel with the use of the air fed in through burner 16 taking place in reaction chamber 12. The liquid methanol is heated and partially vaporized in the first heat exchanger 8 through which the liquid fuel flows. Simultaneously, the decomposition gas discharged from reaction chamber 12 through line 13 is cooled so that charging losses in combustion engine 1 due to elevated temperatures of the mixture are prevented. The remaining liquid methanol is vaporized and the vapor is super-heated in the second heat exchanger 9 heated by the exhaust gases of combustion engine 1, so that the fuel can be fed into reaction chamber 12 in the vapor state at elevated temperatures.

Further utilization of the sensible heat of the exhaust gases removed through exhaust gas line 10 from combustion engine 1, could involve diverting these gases through an outer jacket (not shown) surrounding reaction chamber 12 for indirect heat exchange within the reaction chamber 12.

Depending on the operating condition of the combustion engine, liquid fuel and/or the decomposition gas removed from reaction chamber 12 can now be mixed with the combustion air sucked in through suction line 3. In this case, the addition of decomposition gas, which is limited in volume, will predominate especially under operating conditions where large proportions of harmful substances are usually produced. Such operating conditions include cold start and the warm running of the combustion engine as well as low speed operating conditions in which lean fuel:air ratios are used. During operating conditions approaching high speed, more liquid fuel is used to reach the desired high performance.

The catalyst of this invention is used in reaction chamber 12 at the lowest possible temperatures in the range of approximately 300° C. This converts the methanol during this process as completely as possible into carbon monoxide and hydrogen and at the same time prevents the formation of dimethyl ether.

This catalyst can also be used in a decomposition system constructed similarly in principle for the preparation of hydrogen according to equation (2), in which case the hydrogen is fed—after the removal of the $CO_2$—into a fuel cell for direct conversion into electrical energy.

Several examples for the preparation of the catalysts used according to the invention are given in the following text.

EXAMPLE 1

A commercial $TiO_2$ (specific surface area according to BET = 45 m²/g) was pressed into 4.5 × 4.5 mm tablets after the addition of 8 wt % Al-stearate. These were heated to 640° C. in air during 8 hours, kept at 640° C. for one hour and then cooled again to room temperature. After impregnation with an aqueous solution of $H_2PtCl_6$ (at 25° C.), the Pt-containing tablets were dried (120° C., 4 hours) and calcined (2 hours) at 400° C. The catalyst obtained by this method (K-1) contained 0.3 wt % Pt. Its physical-mechanical data are compiled in Table I.

EXAMPLE 2

A commercial $TiO_2$ (spec. surface area (SA) according to BET = 45 m²/g) was first mixed dry with 25% calcium aluminate cement. Then, after the addition of 60% $H_2O$ (calculated with regard to the material used), wet mixed, and 3% electrographite were added shortly before the end of the mixing process. The moist mass was spread out in a thin layer and air-dried at 120° C. until a loss on drying (LOD) of 8 to 12% was obtained. The mass was then pressed into cylindrical tablets with a diameter of 4.5 mm and a height of 4.5 mm. The tablets were stored for four days in a closed container and then steam treated in a steam autoclave at 5.5 bar and 155° C. for 12 hours. The tablets were then allowed to sit in the air for one day and subsequently heated in air to 640° C. within three hours and maintained at 640° C. for one hour. After cooling, they were impregnated with an aqueous solution of $H_2PtCl_6$. The tablets containing Pt were dried at 120° C. (4 hours) and calcined again at 400° C. (2 hours). The catalyst (K-2) obtained by this method contained 0.3 wt % Pt. Its physical-mechanical data are compiled in Table I.

EXAMPLE 3

A commercial $CeO_2$ (BET-SA = 43 m²/g) was pressed into 4.5 × 4.5 mm tablets after the addition of 8 wt % Al-stearate. These were heated in air at 640° C. for 8 hours, then maintained at 640° C. for one hour and subsequently cooled again to room temperature. After impregnation with an aqueous solution of $H_2PtCl_6$ (at 25° C.), the tablets containing Pt were dried (120° C., 4 hours) and calcined again at 400° C. (2 hours). The catalyst obtained by this method (K-3) contained 0.3 wt % Pt. Its physical-mechanical data are compiled in Table I.

EXAMPLE 4

A commercial honeycomb ceramic refractory with square openings measuring 1.5 mm along each side was dipped in tetraisopropyl titanate (TIPT) at room temperature for 30 minutes.

The carrier was then steam treated in a steam autoclave at 5.5 bar and 155° C. for 12 hours to hydrolyze the TIPT. Then it was calcined in a muffle furnace at 600° C. (2 hours). The honeycomb ceramic carrier contained 6 wt % $TiO_2$ after this treatment.

The $TiO_2$ containing carrier was impregnated with an aqueous solution of $H_2PtCl_6$. Thereafter, it was carefully dried and calcined again at 400° C. (2 hours).

The catalyst (K-4) obtained by this method contained 0.3% Pt; its physical-mechanical data are compiled in Table I.

EXAMPLE 5

A commercial $\alpha$-$Al_2O_3$ substrate (spheres with 2–6 mm diameter, BET-SA = 200 m²/g) was dipped in tetra-isopropyl titanate (TIPT) at room temperature for 15 minutes. Subsequently, the TIPT was hydrolyzed by steam treating in a steam autoclave at 5.5 bar and 155° C. for 12 hours. Then it was calcined at 600° C. (2 hours). The substrate contained 2.6 wt % $TiO_2$.

After impregnation with an aqueous solution of $H_2PtCl_6$, the spheres containing Pt were dried at 120° C. (4 hours) and calcined again at 400° C. (2 hours).

The catalyst (K-5) obtained by this method contained 0.3 wt % Pt; its physical-mechanical data are compiled in Table I.

EXAMPLE 6

A commercial $TiO_2$ (BET-SA = 45 m²/g) was mixed with a commercial $La_2O_3$ (BET-SA = 25 m²/g) (ratio by weight 9:1) for approximately 30 minutes in a pan grinder. After the addition of 8 wt % Al-stearate, the mass was pressed into 4.5 × 4.5 mm tablets and the produced tablets were heated in air to 640° C. for 8 hours, then kept at 640° C. for one hour and subsequently cooled again to room temperature. The tablets were impregnated with an aqueous solution of $H_2PtCl_6$.

The catalyst (K-6) obtained by this method contained 0.3 wt % Pt; its physical-mechanical data are compiled in Table I.

EXAMPLE 7

A commercial $TiO_2$ (BET-SA = 45 m²/g) was mixed with a commercial $La_2O_3$ (BET-SA = 25 m²/g)(ratio by weight 9:1) for approximately 30 minutes in a pan grinder. After the addition of 8 wt % Al-stearate, the mass was pressed into 4.5 × 4.5 mm tablets. These tablets were heated to 640° C. in air for 8 hours, then kept at 640° C. for one hour and subsequently cooled again to room temperature.

The tablets were then impregnated with an aqueous solution of $H_2PtCl_6$ at 25° C.. The tablets containing Pt were dried (120° C., 4 hours) and calcined again at 400° C. (2 hours).

The catalyst (K-7) obtained by this method contained 0.3 wt % Pt; its physical-mechanical data are compiled in Table I.

EXAMPLE 8

The process of Example 7 was repeated with the variation that the $La_2O_3$ was replaced by the same amount of $ZrO_2$. The physical-mechanical data of the catalyst (K-8) obtained by this method are compiled in Table I.

The catalysts obtained according to Examples 1 and 2 were heated to 400° C. in a stream of hydrogen over a period of 3 hours to reduce the noble metal component. After cooling to 300° C., the methanol decomposition was started in a conventional metal tube reactor. The methanol contained 2.2 vol % $H_2O$. The methanol decomposition was carried out with a rate of flow of 2 liters/hour/liter of catalyst at 300°, 350° and 400° C.

The catalysts obtained according to Examples 1 to 8 were heated in a stream of hydrogen to 400° C. over a period of 3 hours to reduce the noble metal component. After cooling to 300° C., a methanol decomposition was carried out with these catalysts in a test reactor, under conditions in the test reactor corresponding to a largely isothermic decomposition. This methanol decomposition was performed at a space velocity of 2 liters per hour and liter of catalyst at 300°, 350° and 400° C. The gas developed by the catalytic decomposition was measured with a gas meter and analyzed by gas chromatography. The results are compiled in Table II.

In additional trials, methanol decomposition was performed under largely autothermic conditions, which correspond principally to the conditions in reaction chamber 12 in the fuel processing system shown in the drawing. Here, the concentration recorded in vol % in Table III were determined as typical gas compositions in 2 trials with catalyst K1 and K5, respectively. The rates of flow were between 3 liters per hour and liter of catalyst and 6 liters per hour and liter of catalyst in these trials. The temperatures in the reactor were between 220° C. and 400° C. A four-cylinder in-line spark-ignition engine of a passenger car with a piston displacement of 1800 cm³ was fed with a decomposition gas obtained by Trial 2 of Table III. The efficiency $\eta$ of the engine as well as the concentration of harmful substances contained in the exhaust gases of the engine were measured at an operating condition corresponding to a road load of 50 kilometers per hour. The results are compiled in Table IV with the fuel:air ratio $\Phi$ as a variable. These results show that using the decomposition gas an engine running is obtainable with very lean air:fuel ratio ($\Phi$=0.48) with good efficiency and with low concentration of harmful exhaust substances.

TABLE I

Physical-Mechanical Data Of The Catalysts Of The Examples

| Cat. No. | Form | BET-SA (m²/g) | BD (g/L) | CS (Kg) | PV (ml/g) | Composition(*) (wt %) |
|---|---|---|---|---|---|---|
| K-1 | 4.5 × 4.5 mm tablets | 40 | 1326 | 17.3 | 0.13 | $TiO_2$ |
| K-2 | 4.5 × 4.5 mm tablets | 15 | 1131 | 39.0 | 0.22 | $TiO_2$(75) Ca—Al-cement |
| K-3 | 4.5 × 4.5 mm tablets | 47 | 1850 | 12.5 | 0.12 | $CoO_2$ |
| K-4 | Honeycomb ceramics | 8 | 358 | — | 0.14 | $TiO_2$(6.1), Cordierite |
| K-5 | 2–5 mm spheres | 125 | 628 | 10.0 | 0.50 | $TiO_2$(2.6), $Al_2O_3$ |
| K-6 | 4.5 × 4.5 mm tablets | 35 | 1350 | 16.0 | 0.12 | $TiO_2$(88), $La_2O_3$(10) |
| K-7 | 4.5 × 4.5 mm tablets | 35 | 1350 | 16.0 | 0.12 | $TiO_2$(88), $La_2O_3$(10) |

TABLE I-continued

Physical-Mechanical Data Of The Catalysts Of The Examples

| Cat. No. | Form | BET-SA ($m^2/g$) | BD (g/L) | CS (Kg) | PV (ml/g) | Composition(+) (wt %) |
|---|---|---|---|---|---|---|
| K-8 | 4.5 × 4.5 mm tablets | 37 | 1400 | 16.0 | 0.13 | $TiO_2$(88), $ZrO_2$(10) |

Explanations:
BET-SA - spec. surface area according to BET method
BD - bulk density
CS - crush strength
PV - pore volume measured by Hg porosimeter
(+)all catalysts contain 0.3 wt % Pt

TABLE II

| Cat. No. | T °C. | Amount Of Gas L/hr (25° C.) | Gas Composition (vol %) CO | $H_2$ | $CO_2$ | $CH_4$ | Methanol Conversion (%) |
|---|---|---|---|---|---|---|---|
| K-1 | 300 | 85 | 26.7 | 66.4 | 4.4 | 2.5 | 46.9 |
|  | 350 | 156 | 28.6 | 65.4 | 3.5 | 2.5 | 86.1 |
|  | 400 | 181 | 28.5 | 65.1 | 3.4 | 3.0 | 99.9 |
| K-2 | 300 | 46 | 29.9 | 66.2 | 2.9 | 1.0 | 25.4 |
|  | 350 | 95 | 30.0 | 66.6 | 2.4 | 1.0 | 52.4 |
|  | 400 | 150 | 30.0 | 66.8 | 2.1 | 1.1 | 82.8 |
| K-3 | 300 | 64 | 25.6 | 71.0 | 3.0 | 0.4 | 35.3 |
|  | 350 | 137 | 28.4 | 68.2 | 3.0 | 0.4 | 75.6 |
|  | 400 | 181 | 29.1 | 67.8 | 2.6 | 0.5 | 99.9 |
| K-4 | 300 | 33 | 33.0 | 65.3 | 0.6 | 1.1 | 18.2 |
|  | 350 | 73 | 32.9 | 65.2 | 0.6 | 1.3 | 40.3 |
|  | 400 | 120 | 32.7 | 65.1 | 0.7 | 1.5 | 66.2 |
| K-5 | 300 | 46 | 26.1 | 72.2 | 0.6 | 1.1 | 25.4 |
|  | 350 | 92 | 27.3 | 70.6 | 0.9 | 1.2 | 50.8 |
|  | 400 | 133 | 29.3 | 68.1 | 1.0 | 1.6 | 73.4 |
| K-6 | 300 | 74 | 26.1 | 68.8 | 3.7 | 1.4 | 40.8 |
|  | 350 | 146 | 28.5 | 67.1 | 3.0 | 1.4 | 80.6 |
|  | 400 | 180 | 28.8 | 66.5 | 3.0 | 1.7 | 99.3 |
| K-7 | 300 | 74 | 26.1 | 68.8 | 3.7 | 1.4 | 40.8 |
|  | 350 | 146 | 28.5 | 67.1 | 3.0 | 1.4 | 80.6 |
|  | 400 | 180 | 28.8 | 66.5 | 3.0 | 1.7 | 99.3 |
| K-8 | 300 | 74 | 25.8 | 68.0 | 3.6 | 2.6 | 40.0 |
|  | 350 | 146 | 28.3 | 66.5 | 3.1 | 2.1 | 79.5 |
|  | 400 | 180 | 28.6 | 66.1 | 2.9 | 2.4 | 98.7 |

Starting material: methanol with 2.2 vol % $H_2O$

TABLE III

| | Gas Composition (vol %), Dry Basis | | | | | Methanol |
|---|---|---|---|---|---|---|
| | CO | $H_2$ | $CO_2$ | $CH_4$ | $N_2$ | |
| Trial 1 | 20.0 | 47.0 | 3.2 | 1.4 | 3.4 | 25.0 |
| Trial 2 | 22.0 | 48.0 | 3.7 | 1.4 | 4.3 | 20.6 |

TABLE IV

Engine Test at road load (50 km/h) condition

| fuel:air ratio Φ | efficiency η | CO % | HC ppm | $NO_x$ ppm |
|---|---|---|---|---|
| 0.89 | 0.209 | 0.225 | 126 | 1050 |
| 0.77 | 0.222 | 0.150 | 140 | 775 |
| 0.69 | 0.223 | 0.150 | 180 | 400 |
| 0.60 | 0.217 | 0.163 | 176 | 118 |
| 0.48 | 0.213 | 0.300 | 270 | 18 |

We claim:

1. Process for the treatment of a liquid consisting of methanol, which comprises the steps of:
   A. directing a first portion of said liquid to a reaction chamber and converting said first portion into conversion products comprising $H_2$ and the oxides of carbon;
   B. directing a second portion of said liquid to a fuel metering device;
   C. mixing said conversion products from said first portion and said liquid from said second portion in said metering device and forming a fuel mixture;
   D. supplying said fuel mixture in timed sequence to the combustion chambers of a combustion engine;
   E. preheating and vaporizing said first portion of said liquid to a temperature of about 200° to 600° C.;
   F. passing said vaporized liquid into a reaction chamber containing a noble metal supported catalyst comprising a noble metal component of Group VIII of the Periodic Table on a carrier material which comprises $TiO_2$ and/or $CeO_2$.

2. A process, as defined in claim 1, in which said $TiO_2$ and/or $CeO_2$ is (are) present in admixture with other refractory metal oxides.

3. A process, as defined in claim 1, in which said $TiO_2$ and/or $CeO_2$ is (are) present in admixture with a hydraulic binder.

4. A process, as defined in claim 1, in which said $TiO_2$ and/or $CeO_2$ is (are) deposited on the surface of a preformed inert refractory carrier.

5. A process, as defined in claim 1, in which the noble metal component is selected from the group consisting of platinum, rhodium, iridium and palladium.

6. A process, as defined in claim 1, in which the concentration of the noble metal of Group VIII is present in the range of from 0.01 to 3%, calculated with respect to the total catalyst.

7. A process, as defined in claim 1, in which the carrier material contains from 1 to 20% of $ZrO_2$ or $La_2O_3$.

8. A process, as defined in claim 3, in which the hydraulic binder is present in the concentration of between 5 to 50% by weight of the total catalyst.

9. A process, as defined in claim 4, in which the preformed refractory carrier is cordierite, mullite, silicon carbide or alpha aluminum oxide.

10. A process, as defined in claim 9, in which the carrier of the preformed refractory substrate is in the form of rings, spheres, honeycombs tablets or extrusion molded pieces.

11. A process, as defined in claim 10, in which the initial components are mixed with a lubricant and tableted, calcined, and thereafter coated with the Group VIII noble metal component.

12. A process, according to claim 11, in which the initial materials are mixed with water, a lubricant and a hydraulic binder, and thereafter tableted, calcined and coated with the Group VIII noble metal component.

13. A process, as defined in claim 4, in which the refractory carriers are impregnated with the soluble salts of titanium or lanthanum.

14. A process, as defined in claim 13, in which the soluble salts of lanthanum include nitrates, formates, acetates or oxalates.

15. A process, as defined in claim 14, in which the preformed refractory carrier is impregnated with a methanolic solution of an alkoxytitanate.

16. A process, as defined in claim 1, in which a oxygen-containing gas is added to the system so as to maintain the reaction at autothermic conditions.

17. A process, as defined in claim 1, in which the conversion of aqueous methanol is kept at a temperature in the range of from 300° to 600° C. and at a pressure of from 0.1 to 10 bar at a space velocity in the range of from 0.5 to 20 liters of anhydrous methanol per hour and liter of catalyst.

18. A process, as defined in claim 1, in which the first portion of liquid is preheated in indirect heat exchange with the exhaust gases from the internal combustion engine.

19. A process, as defined in claim 1, in which the first portion of fuel is preheated in indirect heat exchange with the gas conversion products emerging from the reaction chamber.

20. A process, as defined in claim 1, in which the reaction chamber is preheated upon start-up of the interal combustion engine by ignition of an oxygen-containing gas and liquid methanol.

21. A process, as defined in claim 1, which includes the additional step of adding $H_2O$ to the methanol and feeding the mixture of methanol and $H_2O$ to the reaction chamber at a temperature in the range of from 300° to 600° C., a pressure in the range of from 0.1 to 10 bar and at a space velocity in the range of from 0.5 to 20 liters of methanol per liter of catalyst and hour.

22. A process, as defined in claim 1, which includes the step of
A: directing a third portion of said methanol to a burner;
B: igniting said third portion of methanol; and
C: capturing the heat from said burned to preheat the reaction chamber.

23. For use with the fuel system of combustion engine, having an intake and an exhaust, in combination,
A: a fuel line containing a liquid fuel comprising methanol;
B: a catalytic converter, having an inlet and an outlet installed in operative relation with said fuel line;
C: a first heat exchanger in indirect heat exchange with said fuel line and with the outlet of said catalytic reactor;
D: a metering device in operative relation with the outlet of said catalytic reactor and with said combustion engine;
E: a noble metal catalyst on a carrier, contained in said catalytic reactor, adapted for the catalytic decomposition or steam reforming of methanol at elevated temperatures, in which
  1. said noble metal comprises: an element of Group VIII or the Periodic Table;
  2. said carrier comprises $TiO_2$ and/or $CeO_2$.

24. The combination, as defined in claim 23, fruther combined with a second heat exchanger in indirect heat exchange with said exhaust of said combustion engine and with the fuel line.

25. The combination, as defined in claim 23, the further combination therewith of a burner and an accessory fuel line in operative relation with said catalytic reactor.

26. The combination, as defined in claim 23, in which said $TiO_2$ and/or $CeO_2$ appear(s) either singly or in admixture with other refractory metal oxides.

27. The combination, as defined in claim 23, in which said $TiO_2$ and/or $CeO_2$ is (are) present, either singly or in admixture with a hydraulic binder.

28. The combination, as defined in claim 23, in which said $TiO_2$ and/or $CeO_2$ is (are) applied to the surface of a preformed refractory carrier.

29. A combination, as defined in claim 23, in which the noble metal component is selected from the group consisting of platinum, rhodium, iridium and palladium.

30. The combination, as defined in claim 23, in which the concentration of the noble metal of Group VIII is present in the range of from 0.01 to 3%, calculated with respect to the total catalyst.

31. The combination, as defined in claim 23, in which the carrier material contains from 1 to 20% of $ZrO_2$ or $La_2O_3$.

32. The combination, as defined in claim 27, in which the hydraulic binder is pesent in the concentration of between 5 to 50% by weight of the total catalyst.

33. The combination, as defined in claim 28, in which the preformed refractory carrier is cordierite, mullite, silicon carbide or alpha aluminum oxide.

34. The combination, as defined in claim 28, in which the carrier of the preformed refractory substrate is in the form or rings, spheres, honeycombs, tablets or extruded molded pieces.

35. The combination, as defined in claim 28, in which the initial components are mixed with a lubricant and tableted, calcined and thereafter coated with the Group VIII noble metal component.

36. The combination, as defined in claim 23, in which the initial materials are mixed with water, a lubricant and a hydraulic binder and thereafter tableted, calcined and coated with a Group VIII noble metal component.

37. The combination, as defined in claim 28, in which the refractory carriers are impregnated with the soluble salts of titanium or lanthanum.

38. The combination, as defined in claim 37, in which the soluble salts of lanthanum include nitrates, formates, acetates or oxalates.

39. The combination, as defined in claim 38, in which the preformed refractory carrier is impregnated with a methanolic solution of an alkoxytitanate.

* * * * *

UNITED STATES PATENT AND TRADEMARK OFFICE
CERTIFICATE OF CORRECTION

PATENT NO. : 4,716,859
DATED : January 5, 1988
INVENTOR(S) : König, et al

It is certified that error appears in the above-identified patent and that said Letters Patent is hereby corrected as shown below:

Column 1, lines 5 and 6, delete "The invention concerns a process for the treatment of".

Column 2, line 17, "qeneral" should read -- general --.

Column 11, line 61, "burned" should read -- burner --.

Column 12, line 12, "or" should read -- of --.

Column 12, line 14, "fruther" should read -- further --.

Signed and Sealed this

Thirteenth Day of September, 1988

Attest:

DONALD J. QUIGG

Attesting Officer

Commissioner of Patents and Trademarks